US 12,436,909 B2

United States Patent
Shuler et al.

(10) Patent No.: US 12,436,909 B2
(45) Date of Patent: Oct. 7, 2025

(54) SUPPORT FOR MULTIPLE HOT PLUGGABLE DEVICES VIA EMULATED SWITCH

(71) Applicant: MELLANOX TECHNOLOGIES, LTD., Yokneam (IL)

(72) Inventors: Shahaf Shuler, Kibbutz Lohamei Hagetaot (IL); Peter Paneah, Nesher (IL); Tzuriel Katoa, Tiberias (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 645 days.

(21) Appl. No.: 17/015,424

(22) Filed: Sep. 9, 2020

(65) Prior Publication Data

US 2022/0075747 A1 Mar. 10, 2022

(51) Int. Cl.
*G06F 13/00* (2006.01)
*G06F 13/40* (2006.01)
*G06F 13/42* (2006.01)

(52) U.S. Cl.
CPC ...... *G06F 13/4022* (2013.01); *G06F 13/4081* (2013.01); *G06F 13/4221* (2013.01); *G06F 13/4282* (2013.01); *G06F 2213/0026* (2013.01)

(58) Field of Classification Search
CPC .. G06F 13/00; G06F 13/4022; G06F 13/4081; G06F 13/4221; G06F 13/4282; G06F 2213/0026
See application file for complete search history.

(56) References Cited

U.S. PATENT DOCUMENTS

| | | | |
|---|---|---|---|
| 9,842,075 B1* | 12/2017 | Davis | G06F 13/4295 |
| 9,996,484 B1* | 6/2018 | Davis | G06F 13/105 |
| 10,013,388 B1* | 7/2018 | Wang | G06F 13/4282 |
| 10,394,747 B1* | 8/2019 | Paneah | G06F 13/404 |
| 10,509,758 B1* | 12/2019 | Habusha | G06F 13/4022 |
| 2010/0115174 A1* | 5/2010 | Akyol | G06F 13/385 710/316 |
| 2011/0202701 A1* | 8/2011 | Maitra | G06F 13/4022 710/308 |
| 2014/0075083 A1* | 3/2014 | Engebretsen | G06F 13/4022 710/316 |
| 2016/0365155 A1* | 12/2016 | Kim | G06F 13/4022 |
| 2017/0046295 A1* | 2/2017 | Schwemmer | G06F 13/4282 |
| 2017/0286352 A1* | 10/2017 | Kumar | G06F 13/4022 |
| 2018/0183895 A1* | 6/2018 | Shuler | H04L 67/32 |
| 2018/0365185 A1* | 12/2018 | Risinger | G06F 13/105 |
| 2019/0146943 A1* | 5/2019 | Fender | G06F 13/4072 710/105 |
| 2020/0065271 A1* | 2/2020 | Adiletta | G06F 13/4282 |
| 2021/0374086 A1* | 12/2021 | Jose | G06F 13/4221 |

\* cited by examiner

*Primary Examiner* — Henry Tsai
*Assistant Examiner* — Kim T Huynh
(74) *Attorney, Agent, or Firm* — Sheridan Ross P.C.

(57) ABSTRACT

A networking device, system, and method of operating a networking device are provided. The illustrative networking device is disclosed to include one or more physical ports, an emulated switch positioned between the one or more physical ports and a host device, and one or more emulated devices positioned between the emulated switch and the one or more physical ports. The one or more emulated devices may be configured to populate the one or more physical ports.

20 Claims, 4 Drawing Sheets

SUPPORT FOR MULTIPLE HOT PLUGGABLE DEVICES VIA EMULATED SWITCH

FIELD OF THE DISCLOSURE

The present disclosure is generally directed toward networking and, in particular, toward networking devices and switches.

BACKGROUND

Data storage services are available in which a customer is allowed to rent hardware resources from a remote service provider for the purposes of remote data storage. Apart from the physical machine, the customer is normally required to purchase network and storage services in a dynamic way (e.g., by adding or removing resources over time). The network and storage services are then exposed to the customer with specific networking devices and specific interfaces. Peripheral Component Interconnect (PCI) devices are the most common type of networking devices used and virtio-net and virtio-blk are the most common types of interfaces used.

One approach to support dynamic storage needs of a customer is to deploy physical machines with multiple sockets or to use a switch. Then, at the request of the customer, physical interconnects are plugged or unplugged by an administrator that expose or remove the desired interfaces for the host. While this is a workable solution, it should be appreciated that the solution introduces significant hardware costs and requires constant maintenance from on-site Information Technology (IT) support.

BRIEF SUMMARY

Embodiments of the present disclosure aim to solve the above-noted shortcomings and other issues associated with cloud-based storage solutions. Specifically, embodiments of the present disclosure provide the ability to enable cloud-based storage solutions without incurring unnecessary hardware costs and while enabling remote management of the cloud resources, effectively removing the need for on-site IT support.

In an illustrative embodiment, a networking device is disclosed that includes: one or more physical ports; an emulated switch positioned between the one or more physical ports and a host device; and one or more emulated devices positioned between the emulated switch and the one or more physical ports, where the one or more emulated devices are configured to populate the one or more physical ports.

In another illustrative embodiment, a system is disclosed that includes: an emulated switch positioned between one or more physical ports and a host device; an emulated device positioned between the emulated switch and the one or more physical ports, where the emulated device is configured to populate the one or more physical ports; and an emulation manager in communication with the emulated device, wherein the emulation manager is configured to manage an operational function of the emulated device.

In yet another illustrative embodiment, a method of operating a networking device is disclosed that includes: determining a number of hardware devices to present to a host device; providing a control signal to an emulated switch, where the control signal causes the emulated switch to present the determined number of hardware devices to the host device via one or more emulated devices, and where the emulated switch is provided between the host device and the one or more emulated devices; and enabling the host device to access the determined number of hardware devices via the one or more emulated devices and the emulated switch.

Additional features and advantages are described herein and will be apparent from the following Description and the figures.

BRIEF DESCRIPTION OF THE SEVERAL VIEWS OF THE DRAWINGS

The present disclosure is described in conjunction with the appended figures, which are not necessarily drawn to scale.

DETAILED DESCRIPTION

Figure 1:
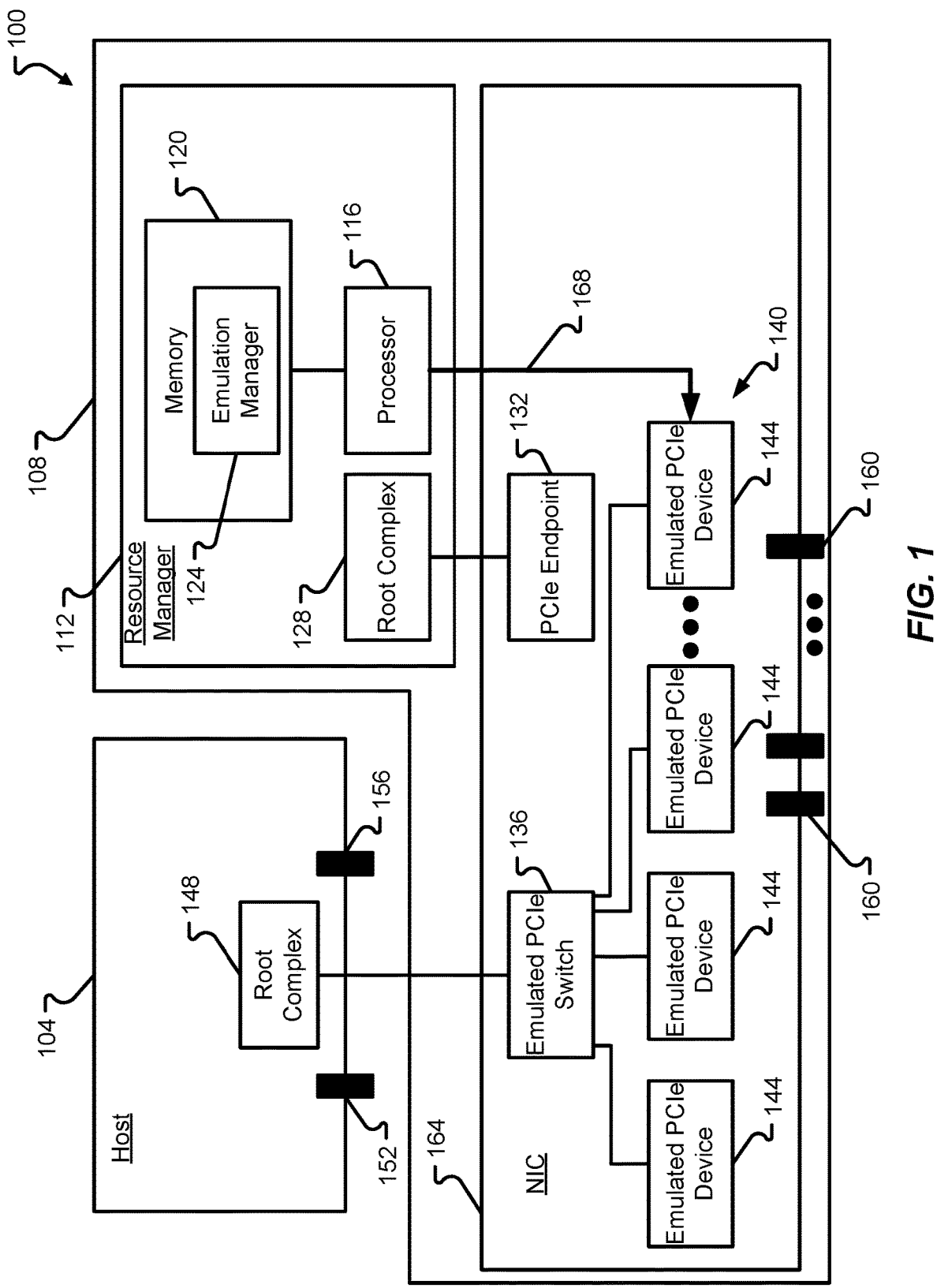
FIG. 1 is a block diagram depicting a first illustrative configuration of a computing system in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation.

Human input is deemed to be material if such input influences how the process or operation will be performed. Human input that consents to the performance of the process or operation is not deemed to be "material."

The terms "determine," "calculate," and "compute," and variations thereof, as used herein, are used interchangeably and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Figure 2:
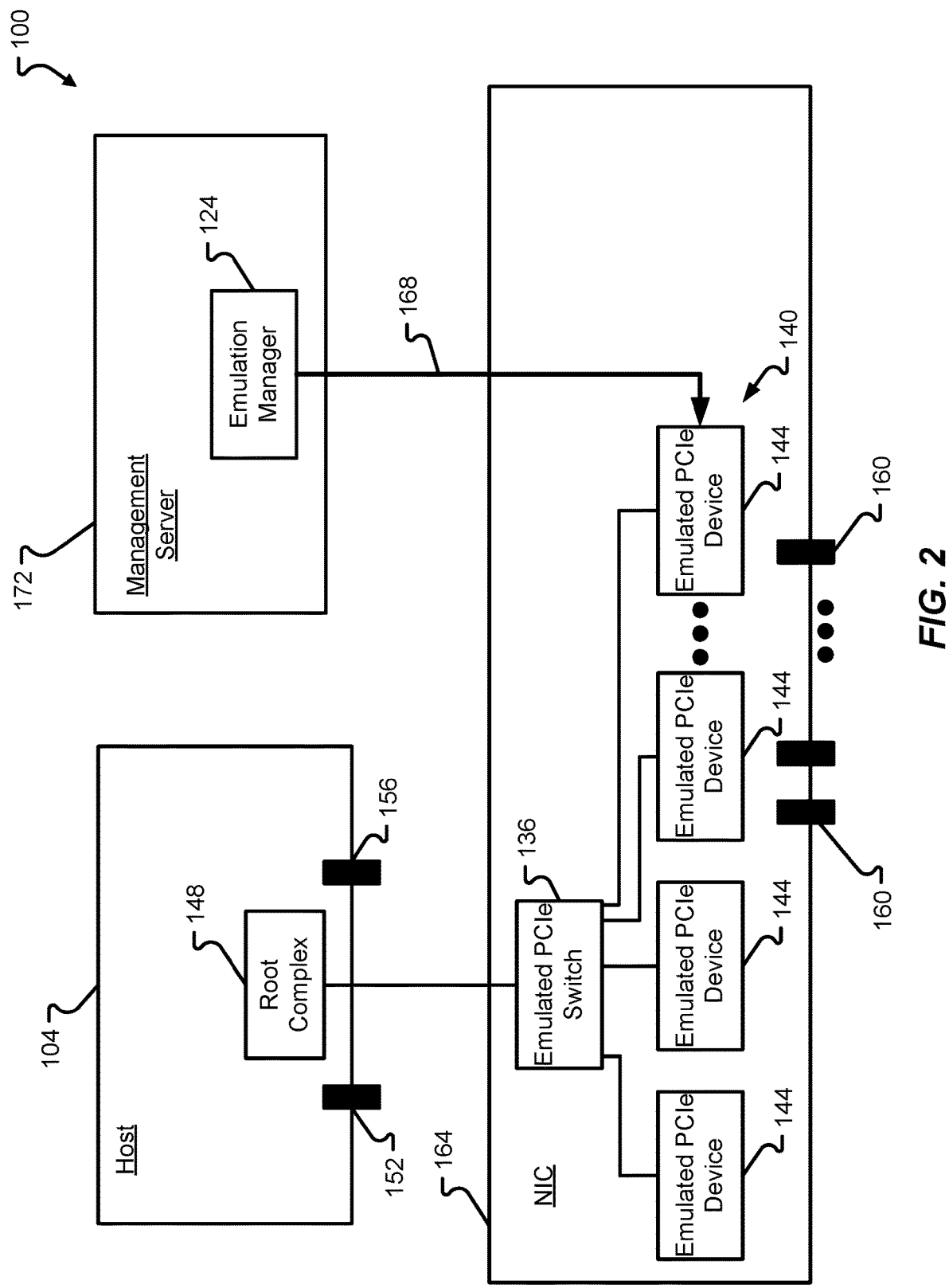
FIG. 2 is a block diagram depicting a second illustrative configuration of a computing system in accordance with at least some embodiments of the present disclosure.
Figure 3:
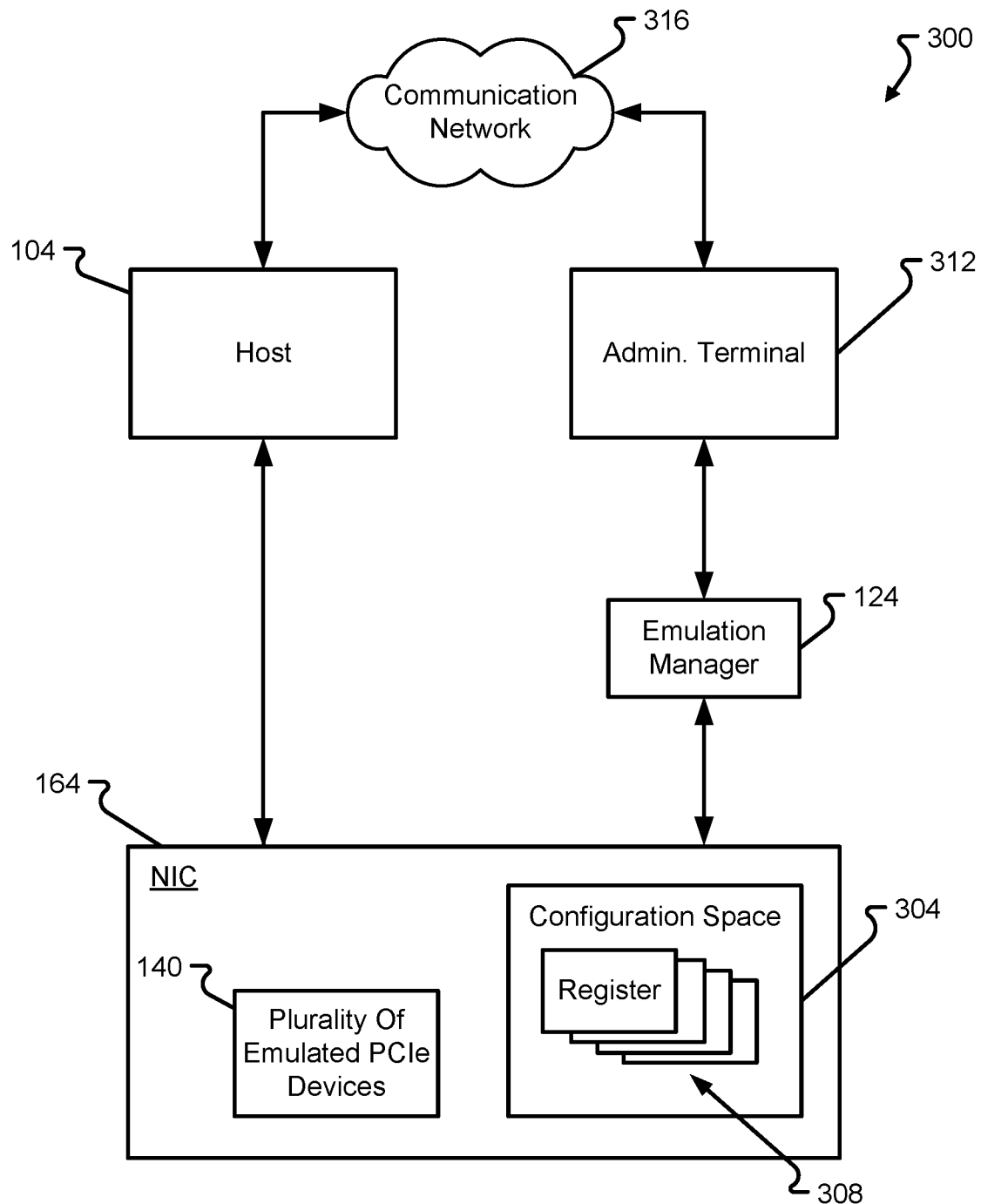
FIG. 3 is a block diagram depicting additional details of a remote data storage system in accordance with at least some embodiments of the present disclosure.

Referring now to FIGS. 1-3, various systems and methods for emulating a switch and a device for purposes of presenting hardware to a host will be described in accordance with at least some embodiments of the present disclosure. In particular, examples of enabling Remote Direct Memory Access (RDMA) between a host and a physical port of a Network Interface Card (NIC) by emulating a PCIe switch and PCIe devices are disclosed. Emulated devices may correspond to storage device and/or network devices. While various examples of emulation will be described in connection with PCIe switches and PCIe devices connected to switches, it should be appreciated that embodiments of the present disclosure are not so limited. In particular, embodiments of the present disclosure contemplate emulation of non-PCI devices or other types of devices that may reside between a host and hardware device (e.g., a physical port of the NIC).

Referring initially to FIGS. 1 and 2, various possible configurations of a system 100 will be described in accordance with at least some embodiments of the present disclosure. As shown in FIG. 1, a host 104, which may also be referred to as a host device, may be in communication with a Network Interface Card (NIC) 164. The host 104 may be connected to the NIC 164 through one or more different types of communication networks. Although not depicted, a packet-based communication network may be used to connect the host 104 to the NIC 164. More specific, but non-limiting, examples of a communication network that may be used to connect a host 104 with a NIC 164 include an Internet Protocol (IP) network, an Ethernet network, an InfiniBand (IB) network, a FibreChannel network, the Internet, a cellular communication network, a wireless communication network, combinations thereof (E.g., Fibre Channel over Ethernet), variants thereof, and the like.

The host 104, in some embodiments, may correspond to one or more of a Personal Computer (PC), a laptop, a tablet, a smartphone, a server, a collection of servers, or the like. It should be appreciated that a host 104 may also be referred to as a network host, an Ethernet host, an IB host, etc. In some embodiments, the host 104 may correspond to any appropriate type of device that communicates with other devices also connected to a common type of communication network. As another specific but non-limiting example, the host 104 may correspond to a server offering information resources, services and/or applications to user devices, client devices, or other hosts in the system 100. It should be appreciated that the host 104 may be assigned at least one network address and the format of the network address assigned thereto may depend upon the nature of the communication network to which the host 104 is connected.

In the example of FIG. 1, the NIC 164 is included as part of a smart NIC 108. The smart NIC 108 may, in addition to including the NIC 164, also includes a resource manager 112. The resource manager 112 may be provided on a circuit board (e.g., a Printed Circuit Board (PCB)) that is connected to the NIC 164 by one or more wires or traces. In some embodiments, the NIC 164 and resource manager 112 may be provided on a common carrier board or the components of the resource manager 112 may be mounted to the same structure that also houses the NIC 164.

The resource manager 112 may include a number of components that enable local management of the NIC 164. In some embodiments, the resource manager 112 may include a processor 116, memory 120, and a root complex 128. The processor 116 may be configured to execute instructions stored in memory 120. As some non-limiting examples, the processor 116 may correspond to a microprocessor, an Integrated Circuit (IC) chip, a Central Processing Unit (CPU), or the like. The memory 120 may correspond to any type of memory device or collection of memory devices configured to store instructions. Non-limiting examples of suitable memory devices that may be used for memory 120 include Flash memory, Random Access Memory (RAM), Read Only Memory (ROM), variants thereof, combinations thereof, or the like. In some embodiments, the memory 120 and processor 116 may be integrated into a common device (e.g., a microprocessor may include integrated memory).

Illustratively, the instructions stored in memory 120 may include an emulation manager 124. The emulation manager 124, when executed by the processor 116, may enable the resource manager 112 to control various functions of the NIC 164 as will be described in further detail herein. For instance, the resource manager 124 may be configured to provide one or more control signals on a control signal path 168 that selectively present and hide a plurality of emulated PCIe devices 140 for the host 104. The resource manager 112 may also be configured to control an emulated PCIe switch 136, which controls a presentation of each PCIe device 144 in the plurality of emulated PCIe devices 140 to the host 104. In some embodiments, the resource manager 112 may be configured to control the plurality of emulated PCIe devices 140 by instructing the emulated PCIe switch 136 to selectively plug and unplug one or more of the emulated PCIe devices 144.

The emulated PCIe switch 136 and plurality of emulated PCIe devices 140 may be provided between the host 104 and one or more hardware devices 160 of the NIC 164. Each hardware device 160 may correspond to a hardware resource of the NIC 164. In some embodiments, the hardware devices 160 may each correspond to a physical port of the NIC 164.

The NIC 164 or smart MC 108 may expose the emulated PCIe switch 136 toward the host 104. The emulated PCIe switch 136 may be configured to hotplug and hot-unplug each emulated PCIe device 144 to support dynamic modifications of hardware allocation (e.g., memory allocation, hardware device allocation, port allocation, etc.) for the host 104. As used herein, the term hotplug and hot-unplug may also refer to a hot-swap function. A hotplug/hot-unplug action or hot-swap action may be performed on a PCIe device. In accordance with at least some embodiments, this type of action (e.g., hotplug/hot-unplug or hot-swap) allows an endpoint (e.g., an emulated PCIe device 144) or one or more emulated PCIe switches 136 with one or more endpoints to be inserted or removed from a system 100 from the perspective of the host 104. In some embodiments, the term hotplug/hot-unplug or hot-swap may reference the fact that the insertion or removal of the endpoint occurs gracefully and without any additional system requirements (e.g., that some other component be turned off or that system functions be interrupted). In the system 100 supporting the hotplug/hot-unplug or hot-swap of emulated PCIe devices 144, the NIC 164 is connected to the root complex 148 of a host 104 using a cable or wired connection (e.g., utilizing PCIe cables). However, unlike a traditional hot-swap environment, the emulated PCIe switch 136 and emulated PCIe devices 140 are not statically connected to the root complex 148 by a PCIe cable. Rather, connections between the root complex 148 and the emulated PCIe switch 136 may be selectively controlled by the resource manager 112 implementing functionality of the emulation manager 124. If an appropriate control signal is provided to the NIC 164 from the resource manager 112, then the emulated PCIe switch 136 and one or more of the emulated PCIe devices 140 may appear to the host 104 as being available for access. More specifically, when an emulated PCIe device 144 is hotplugged or hot-swapped in for a host 104, then a hardware device 160 (e.g., a physical port) is made available to the host 104. This specifically means that the hardware device 160 can be viewed by the host 104 and that actions consistent with the hardware device 160 (e.g., RDMA) may be facilitated between the host 104 and the hardware device 160 via the newly hotplugged emulated PCIe device 144. In some embodiments, the emulated PCIe device 144 may expose storage and/or network devices, thereby providing the host 104 with access to storage and/or networking capabilities.

Enabling the emulated PCIe switch 136 to hotplug and hot-unplug multiple emulated PCI devices 140 to downstream hardware devices 160 permits many features not previously possible. For instance, having emulated PCIe switch 136 will enable a cloud memory provider a simple and efficient mechanism for managing the different services exposed to the host 104. Moreover, the different services can be managed via software (e.g., the emulation manager 124) rather than relying upon an IT administrator to physically move hardware or physically plug/unplug cables from ports. In addition, the emulated PCIe switch 136 and emulated PCIe devices 140 help to reduce the amount of hardware required for the NIC 164 or smart NIC 108 as there is no need for a physical switching device or server that can be plugged with multiple PCIe devices. Thus, it should be appreciated that the emulated PCIe switch 136 may correspond to some basic hardware components that facilitate physical interconnection with a cable or the like, thereby establishing a communication channel with the root complex 148, but traditional hardware used to perform the switching function may be replaced by remotely-configurable hardware components and/or software components.

In some embodiments, a PCIe switch is a PCI device that switches PCIe buses. This is traditionally accomplished by a packet-based communications protocol controlling traffic through the PCIe switch providing, among other features, Quality of Service (QoS), interrupt handling, and error handling services The NIC 164 or smart MC 108 described herein supports PCIe switch emulation via use of the emulated PCIe switch 136. Much like a traditional PCIe switch, the emulated PCIe switch 136 is exposed to the host 104. The emulated PCIe switch 136 may also include multiple downstream hardware devices 160 (e.g., physical ports) and each of the hardware devices 160 can be populated with an emulated PCIe device 144. In some embodiments, a 1:1 matching may occur between an emulated PCIe device 144 and hardware device 160, meaning that one emulated PCIe device 144 may be responsible for populating a particular hardware device 160 and not other hardware devices 160. In other embodiments, a 1:1 matching may not be necessary and one emulated PCIe device 144 may populate more than one hardware device 160. In yet another possible configuration, a single hardware device 160 may be populated by more than one emulated PCIe device 144.

The hotplug/hot-unplug of a hardware device 160 may describe the action of plugging or unplugging an emulated PCIe device 144 to/from an associated downstream hardware device 160. The control signal(s) used to invoke the hotplug/hot-unplug actions may be provided over a control signal path 168. As will be discussed in further detail herein, the hotplug/hot-unplug may be emulated by setting appropriate registers in a configuration space of the NIC 164. As a more specific but non-limiting example, hotplug/hot-unplug may be emulated by setting/unsetting a register in a PCIe configuration space for a corresponding emulated PCIe device 144 and then sending an MSIx to the host 104 on behalf of the emulated PCIe device 144 (e.g., emulating an action taken by a hotplugged/hot-unplugged slot). As will be discussed in further detail herein, the hotplug/hot-unplug functions of the emulated PCIe switch 136 and/or emulated PCIe devices 140 may be managed locally within the smart NIC 108 as shown in FIG. 1 or centrally/remotely as will be discussed in connection with FIG. 2.

Continuing the discussion of FIG. 1, the smart NIC 108 is shown to have the resource manager 112 also connected to at least one physical PCIe endpoint 132 of the NIC 164. The resource manager 112 may be connected to the PCIe endpoint 132 via its own root complex 128. Although depicted differently, it should be appreciated that the control signal path 168 may pass through the root complex 128 and PCIe endpoint 132. In other words, the connection between the root complex 128 and PCIe endpoint 132 may carry control signals between the resource manager 112 and the NIC 164, where the control signals are used to control operations of the emulated PCIe switch 136 and/or control operations of the emulated PCIe devices 144.

As discussed above, the emulated PCIe devices 144 may each emulate a PCIe endpoint 132 without including all of the hardware traditionally required by the PCIe endpoint 132. In some embodiments, each emulated PCIe device 144 may expose network and storage services to the host 104 via one or more known interfaces. A virtio-net 152 and virtio-blk 156 are two examples of interfaces that may be used by the host 104. In this particular example, one of the emulated PCIe devices 144 may be configured to represent a virtio-net PCIe endpoint to the host 104, another of the emulated PCIe devices 144 may be configured to represent a virtio-blk PCIe endpoint to the host 104, and other emulated PCIe devices 144 may be unplugged and represent empty PCIe endpoints. The resource manager 112 may be configured to provide different control signals on the control signal path 168 to adjust the type of endpoint that is presented to the host 104 by any particular emulated PCIe device 144.

In embodiments where the hardware devices 160 correspond to physical ports and the host 104 performs RDMA, the host 104 may exchange RDMA packets with the NIC 164 using any appropriate type of packet format and protocol. The format of RDMA packets used by the host 104 may depend upon the type of communication network that is used to connect the host 104 with the NIC 164.

With reference now to FIG. 2, a central or remotely-located emulation manager 124 is depicted. As compared to FIG. 1, FIG. 2 illustrates the emulation manager 124 being provided in a management server 172 rather than a resource manager 112. This particular configuration of the system 100 enables an emulation manager 124 to be executed at the remotely-located management server 172, which means that multiple different NICs 164 may be managed by a common emulation manager 124. The emulation manager 124 may enable the management server 172 to behave similarly to the resource manager 112 previously discussed. For instance, the emulation manager 124, when executed by a processor of the management server 172, may enable the management server 172 to control operations of the emulated PCIe switch 136 and/or operations of the emulated PCIe devices 140. In some embodiments, the emulation manager 124 may also enable the management server 172 to provide control signals to the NIC 164 on a control signal path 168. The control signal path 168 may or may not flow through a root complex 128 as with the configuration of FIG. 1.

Although not depicted, the management server 172 may include a processor, memory, and network interface. The processor and memory of the management server 172 may be similar to the processor 116 and memory 120, respectively. In some embodiments, the management server 172 may communicate with the NIC 164 via a communication network or through a direct connection. The management server 172 may also be in communication with the host 104 via a communication network, but such a configuration is not required. In some embodiments, the management server 172 may be operated or controlled by another computational device that is operated by an IT administrator. In other embodiments, the management server 172 may be controlled by a computational device that is operated by an entity that also operates the host 104. For example, the entity that operates the host 104 may be enabled to dynamically access more resources of the NIC 164 by providing appropriate requests or control signals to the management server 172, which then controls one or more functions of the emulated PCIe switch 136 and/or emulated PCIe devices 140.

With reference now to FIG. 3, additional details of a system 300 used to facilitate communications with the emulation manager 124 will be described in accordance with at least some embodiments of the present disclosure. The system 300 is shown to include an administration terminal 312 that is in communication with the emulation manager 124. The system 300 also depicted the administration terminal 312 as being in communication with a host 104 by way of a communication network 316. The communication network 316 may or may not be the same communication network that is used to connect the host 104 to the NIC 164. In some embodiments, the communication network 316 may correspond to a distributed communication network (e.g., the Internet) and the communication network 316 may utilize IP-based communication protocols to facilitate communications between the host 104 and administration terminal 312.

The administration terminal 312 may be operated by an entity that provides remote data storage services to customers by way of exposing one or more NICs 164 to hosts 104 of their customers. The administration terminal 312, in some embodiments, may be operated by an IT administrator that is also responsible for the operations of the NIC 164. However, in some embodiments, it may be feasible to enable a customer to utilize the administration terminal 312 by providing limited access (e.g., credential-based access) to the administration terminal 312. In this way, the customer that purchases the remote data storage services may be allowed to self-administer their data storage capabilities. Adjustments desired by the customer operating the host 104 may be implemented at the NIC 164 without requiring an IT administrator or operator of the administration terminal 312 to physically interact with the NIC 164 or cables attached thereto.

As shown in FIG. 3, the administration terminal 312 may communicate with the emulation manager 124. Although not depicted, it should be appreciated that the emulation manager 124 may be provided within a smart NIC 108 or within a management server 172. In other words, the administration terminal 312 may be configured to interact with either an emulation manager 124 provided within a smart NIC 108 or an emulation manager 124 provided within a management server 172.

The NIC 164 is further shown to include a configuration space 304 having a plurality of registers 308. In some embodiments, the operations of the registers 308 (e.g., the setting of any particular register) may be managed/controlled by the emulation manager 124 using a control signal transmitted over a control signal path 168. Each of the plurality of emulated PCIe devices 140 may have a corresponding one or corresponding set of registers 308 within the configuration space 304. A register 308 or set of registers may be mapped to memory locations based on the emulated PCIe device 144 with which the register 308 is associated. Drivers for the plurality of emulated PCIe devices 140 may have access to the configuration space 304 either directly or through an API of an operating system that enables access to the configuration space 304. Configuration reads and writes may be initiated from the emulation manager 124 using I/O addresses and/or memory-mapped configuration.

In some embodiments, the emulation manager 124 may be configured to manage an operational function of the emulated PCI devices 144 in the plurality of emulated PCIe devices 140. Non-limiting examples of operational functions that may be controlled by the emulation manager 124 with the emulated PCIe devices 144 include Quality of Service (QoS) functions, interrupt handling, and error handling services. Additionally, the emulation manager 124 may be configured to enable hotplug/hot-unplug functions at the emulated PCIe switch 136.

Figure 4:
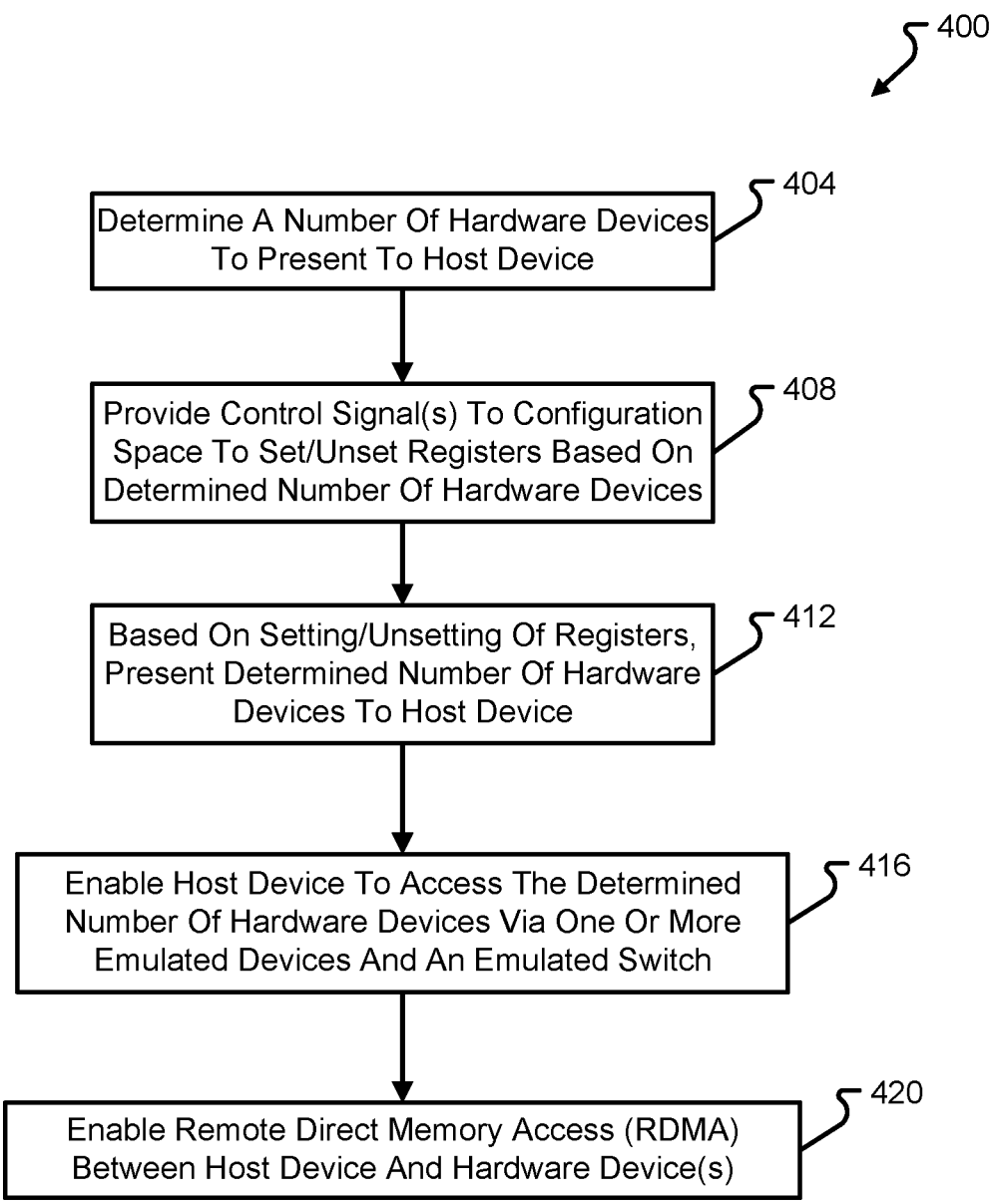
FIG. 4 is a flow diagram depicting a method of operating a networking device in accordance with at least some embodiments of the present disclosure.

Referring now to FIG. 4, a method of operating a networking device (e.g., a NIC 164 and/or smart NIC 108) will be described in accordance with at least some embodiments of the present disclosure. The method begins by determining a number of hardware devices 160 to present to a host device 105 (step 404). This particular step may be performed based on a subscription level of a customer that is operating the host 104. In some embodiments, the determining may be performed by an operator of the administration terminal 312 based on the subscription level of a customer. In some embodiments, the determining may be performed by the emulation manager 124 based on inputs received from the administration terminal 312 and/or based on inputs received from a customer operating the host 104. The determining may also depend upon the nature of the hardware device 160, the number of resources requested by the customer, and the number of resources already made available to other customers.

The method may continue by providing one or more control signals to the configuration space 304 to set registers based on the determined number of hardware devices 160 (step 408). In particular, the emulation manager 124 may provide one or more control signals over the control signal path 168 to set or unset register values for those registers 308 associated with the emulated PCIe devices 144 needed to support the determined number of hardware devices 160. For example, if it is determined that one hardware device 160 is to be presented to the host 104, then an appropriate register 308 or set of registers will be set such that the associated emulated PCIe device 144 exposes the hardware device 160 to the host 104 (step 412). In some embodiments, setting a register 308 may to present an emulated PCIe device 144 to the host 104, where setting the register 308 causes the emulated PCIe device 144 to emulate a hotplug or hot-unplug action to the host 104. In some embodiments, setting the register 308 may present the host 104 with an image of the one or more emulated PCIe devices 144 as being hardware devices 160 or associated with particular hardware devices 160.

Once the host 104 is able to view the determined number of hardware device(s) 160, the method may continue by enabling the host 104 to access the hardware device(s) 160 via the emulated PCIe switch 136 and appropriate emulated PCIe device(s) 144 (step 416). In some embodiments, enabling a host 104 to access the hardware device(s) 160 may enable the host 104 to perform one or more memory functions with the hardware device(s) 160 (step 420). As an example, the host 104 may be enabled to perform RDMA with the hardware device(s) 160.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A networking device, comprising:
   one or more physical ports;
   an emulated switch positioned between the one or more physical ports and a host device; and
   one or more emulated devices positioned between the emulated switch and the one or more physical ports, wherein the one or more emulated devices are configured to emulate an endpoint by exposing network and storage services to the host device via an interface, wherein a resource manager provides one or more control signals on a control signal path to adjust a type of endpoint that is presented to the host device by the one or more emulated devices.

2. The networking device of claim 1, wherein the one or more emulated devices comprise one or more emulated Peripheral Component Interconnect (PCI) devices, the networking device further comprising:
   an emulation manager in communication with the one or more emulated devices, wherein the emulation manager is configured to manage an operational function of the one or more emulated PCI devices.

3. The networking device of claim 2, wherein the emulated switch is configured to perform a hotplug or hot-unplug of the one or more emulated PCI devices.

4. The networking device of claim 2, wherein the operational function of the one or more emulated PCI devices comprises a Quality of Service (QoS) function.

5. The networking device of claim 2, wherein the operational function of the one or more emulated PCI devices comprises interrupt handling.

6. The networking device of claim 2, wherein the operational function of the one or more emulated PCI devices comprises error handling services.

7. The networking device of claim 2, wherein the emulation manager comprises executable instructions, wherein the networking device further comprises:
   a processor on which the executable instructions are executed.

8. The networking device of claim 7, further comprising:
   a Network Interface Card (NIC), wherein the NIC comprises the one or more physical ports, the emulated switch, and the one or more emulated PCI devices, wherein the NIC communicates with the processor via a root complex, and wherein the NIC presents the host device with an image of the one or more emulated PCI devices as being hardware devices.

9. The networking device of claim 1, further comprising:
   a configuration space having at least one register for each of the one or more emulated devices, wherein the at least one register is set or unset to present the host device with a view of the one or more emulated devices.

10. The networking device of claim 1, wherein the one or more emulated devices comprise one or more emulated Peripheral Component Interconnect express (PCIe) devices, wherein the emulated switch comprises an emulated PCIe switch, and wherein the interface comprises at least one of a virtio-net interface and a virtio-blk interface.

11. A system, comprising:
    an emulated switch positioned between one or more physical ports and a host device;
    an emulated device positioned between the emulated switch and the one or more physical ports, wherein the emulated device is configured to emulate an endpoint by exposing network and storage services to the host device via an interface;
    an emulation manager in communication with the emulated device, wherein the emulation manager is configured to manage an operational function of the emulated device; and
    a resource manager that provides one or more control signals on a control signal path to adjust a type of endpoint that is presented to the host device by the emulated device.

12. The system of claim 1, wherein the emulated switch is configured to perform a hotplug or hot-unplug of the emulated device.

13. The system of claim 12, wherein the operational function comprises at least one of a Quality of Service (QoS) function, interrupt handling, and error handling services.

14. The system of claim 12, further comprising:
    a processor configured to execute the emulation manager.

15. The system of claim 14, further comprising:
a Network Interface Card (NIC), wherein the NIC comprises the emulated switch and the emulated device, wherein the NIC communicates with the processor via a root complex, and wherein the NIC presents the host device with an image of the emulated device as being a hardware device.

16. The system of claim 12, further comprising:
a plurality of emulated devices; and
a configuration space having a register for each of the plurality of emulated devices, wherein the register for each of the plurality of emulated devices is set or unset to control a presentation of each of the plurality of emulated devices to the host device.

17. The system of claim 12, wherein the emulated device comprises a Peripheral Component Interconnect (PCI) device, wherein the emulated switch comprises an emulated PCI switch, and wherein the interface comprises at least one of a virtio-net interface and a virtio-blk interface.

18. A method of operating a networking device, comprising:
determining a number of hardware devices to present to a host device;
providing a control signal to an emulated switch over a control signal path, wherein the control signal causes the emulated switch to present the determined number of hardware devices to the host device via one or more emulated devices and to adjust a type of endpoint that is presented to the host device by the one or more emulated devices, wherein the emulated switch is provided between the host device and the one or more emulated devices; and
enabling the host device to access the determined number of hardware devices via the one or more emulated devices and the emulated switch.

19. The method of claim 18, wherein the determined number of hardware devices comprise a determined number of physical ports, the method further comprising:
enabling Direct Memory Access (DMA) between the host device and the determined number of physical ports.

20. The method of claim 18, wherein the control signal path passes through a root complex, the method further comprising:
setting a register to present an emulated device from the one or more emulated devices to the host device, wherein setting the register causes the emulated device to emulate a hotplug or hot-unplug action to the host device.

* * * * *